(12) United States Patent
Love

(10) Patent No.: US 7,362,563 B2
(45) Date of Patent: Apr. 22, 2008

(54) SYSTEM FOR HOUSING WRITING INSTRUMENTS OF DIFFERENT SIZES IN A PORTABLE COMPUTER

(75) Inventor: John Love, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 260 days.

(21) Appl. No.: 11/284,480

(22) Filed: Nov. 22, 2005

(65) Prior Publication Data

US 2007/0115618 A1    May 24, 2007

(51) Int. Cl.
*H05K 7/12* (2006.01)
(52) U.S. Cl. .................... 361/679; 345/179; 178/19.01
(58) Field of Classification Search ................ 361/679; 345/179; 178/19.01
See application file for complete search history.

(56) References Cited

U.S. PATENT DOCUMENTS

| | | | | |
|---|---|---|---|---|
| 4,927,986 A | * | 5/1990 | Daly ....................... | 178/19.01 |
| 6,392,639 B1 | * | 5/2002 | Lee et al. .................... | 345/179 |
| 7,023,430 B2 | * | 4/2006 | Liu et al. .................... | 345/179 |
| 7,054,965 B2 | * | 5/2006 | Bell et al. ..................... | 710/72 |

* cited by examiner

*Primary Examiner*—Jayprakash N Gandhi
*Assistant Examiner*—Ingrid Wright
(74) *Attorney, Agent, or Firm*—Jeffrey A. Proehl; Woods Fuller Schultz & Smith

(57) ABSTRACT

A system that includes an electronic device (such as a portable computer), a writing instrument, and a receptacle located on the device for removably receiving the writing instrument. The receptacle includes an opening on the device and a channel in communication with the opening and extending inwardly with respect to the device. The system further includes an adapter structure configured to change an effective width of the channel between at least two widths to thereby hold writing instruments of different widths in the receptacle.

24 Claims, 4 Drawing Sheets

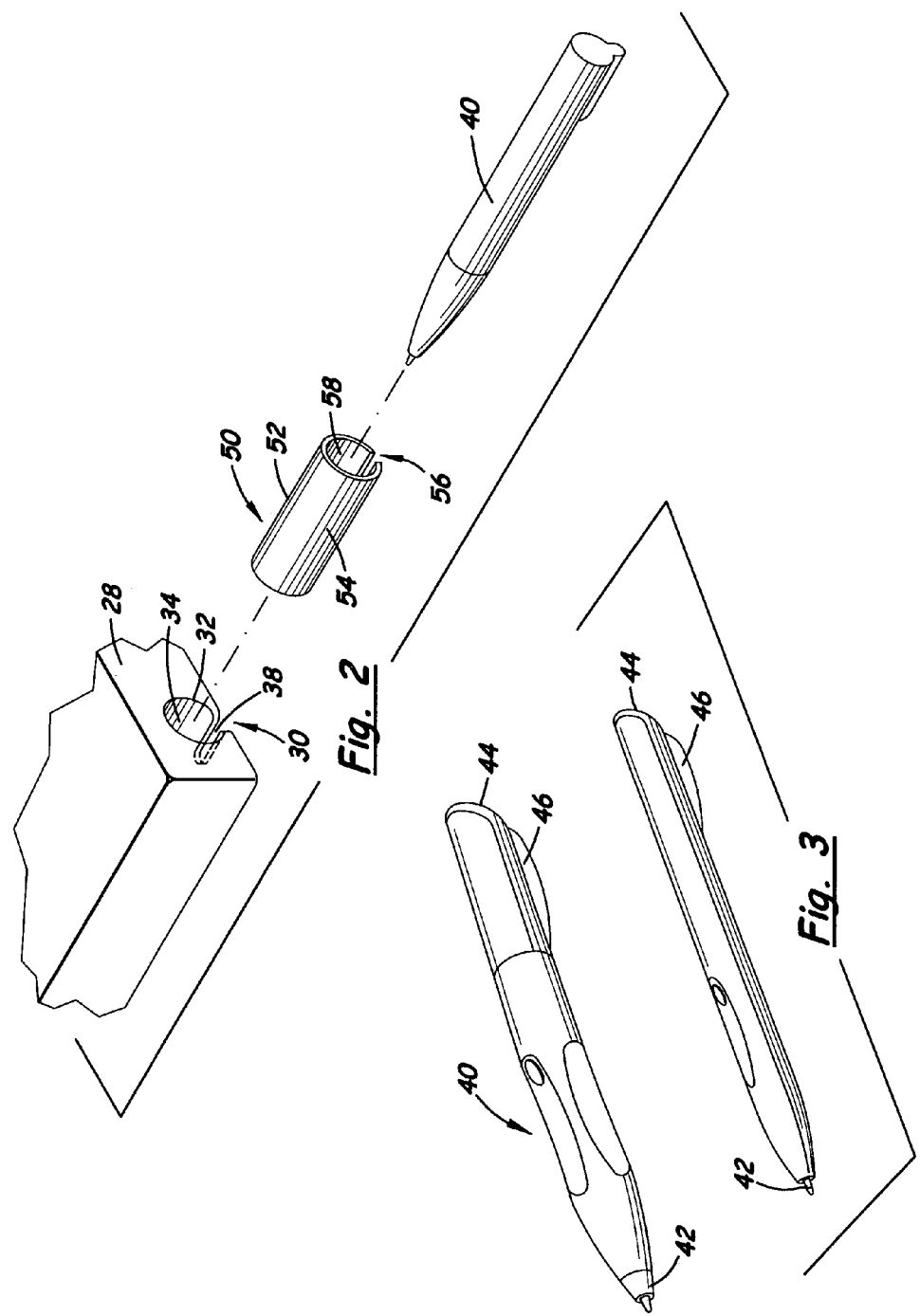

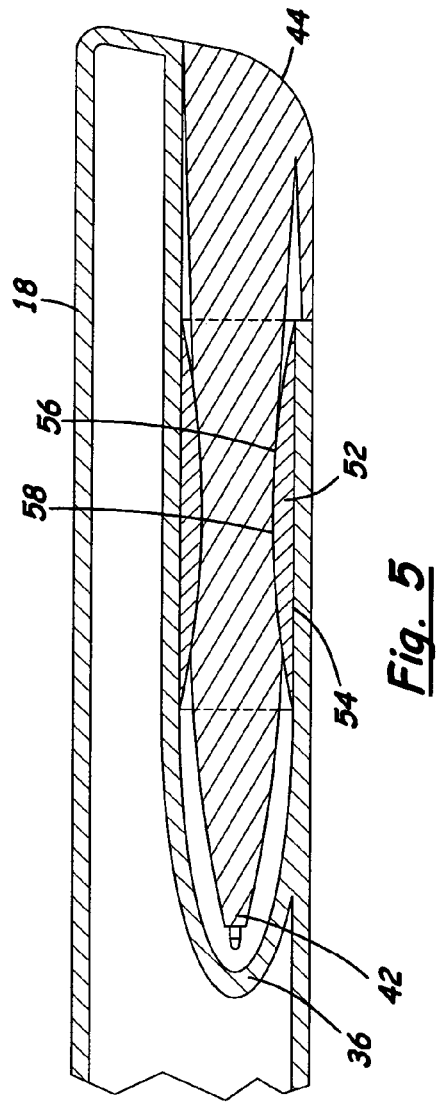
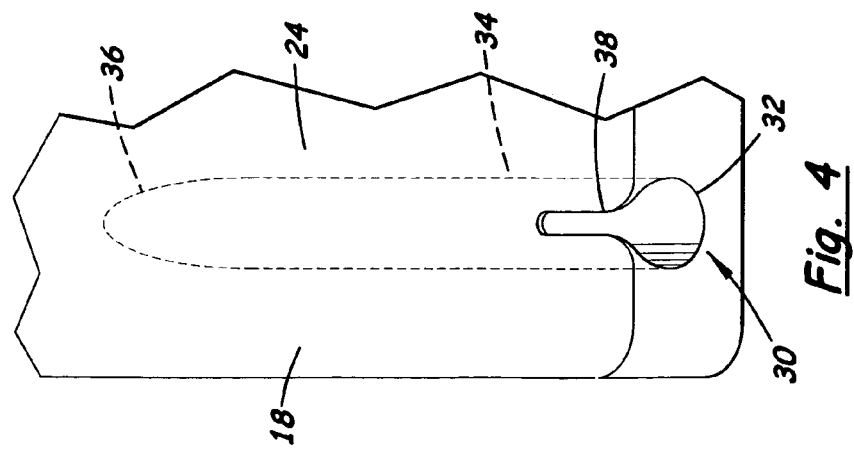

SYSTEM FOR HOUSING WRITING INSTRUMENTS OF DIFFERENT SIZES IN A PORTABLE COMPUTER

BACKGROUND OF THE INVENTION

1. Field of the Invention

The present invention relates to portable computer accessories, and more particularly pertains to a new system for housing writing instruments of different sizes in a portable computer that enables the mounting of a variety of instruments on the computer without having to reconfigure a receptacle for the instrument on the computer.

2. Description of the Prior Art

Computers, such as portable computers, are often used with accessories that facilitate the operation of the computer. For example, portable computers that include tablet touch sensitive screens are typically actuated or operated using a stylus that includes a point that is relatively non-injurious to the touch screen as compared to a writing pen. As styli are not readily available to the user, it is desirable to mount a suitable stylus on the portable computer so that it is close at hand when needed, and the user thus does not have to resort to using finger touch or even a pen or pencil to operate the touch screen. While external clips may be used, it is often preferred to form a receptacle in the body of the portable computer to removably receive the stylus. In such implementations, the size and shape of the receptacle is usually closely tailored to the size and shape of the exterior of the stylus to securely hold the stylus between uses and resist rattling of the stylus against the housing of the portable computer when the stylus is positioned in the receptacle.

However, this manner of storing the stylus in the housing of the portable computer serves to limit the configuration of the stylus to one particular configuration, or dimension, as it is typically not feasible or economical to vary the configuration of the receptacle in the housing to accept different sizes or styles or configurations of styli to offer additional options in the design or function of the stylus. Thus, the user of the computer has generally been limited to one stylus design for a particular computer. This limitation can be a problem when the manufacturer of the portable computer desires to offer a number of optional styli designs as, for example, updates from an original stylus offering or upgrades from a standard stylus offering.

Therefore, there is a need for the ability to offer styli of different configurations while still retaining the ability to position the different configurations or dimensions in a common receptacle in the housing of the computer that does not have to be varied to accommodate the different styli configurations.

SUMMARY OF THE INVENTION

The present invention addresses these limitations in the prior art by providing an adapter for permitting writing instruments, such as styli, pens and pencils, of various sizes to be removably received in the same receptacle formed in the housing of a portable computer. Thus, instruments of different sizes, configurations and capabilities may be offered to the purchaser and user of the computer without losing the use of the receptacle on the housing.

To attain this, the present invention generally comprises a system that includes an electronic device, a writing instrument, and a receptacle located on the device for removably receiving the writing instrument. The receptacle includes an opening on the computer and a channel in communication with the opening and extending inwardly with respect to the device. Further, the system includes an adapter structure configured to change an effective width or diameter of the channel between at least two widths to thereby hold writing instruments of different widths in the receptacle.

The foregoing is merely a general outline of some of the more important features of the invention, and the detailed description of this application that follows discloses additional features and elements of the invention which will form the subject matter of the claims appended hereto.

One significant advantage of the present invention is that a variety of different sizes of writing instruments may be housed on an electronic device, such as, for example, a portable computer housing, without having to make changes to the housing to change the size of the receptacle to securely hold the instrument.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 2 is a schematic enlarged and exploded perspective view of the adapter system of the present invention.

FIG. 3 is a schematic perspective view of two sizes of writing instrument that may be utilized with the portable computer using the adapter system of the present invention.

FIG. 4 is a schematic bottom view of a portion of the housing of the portable computer of the present invention.

FIG. 5 is a schematic lateral cross sectional view of the portable computer implementing the present invention taken along line 5-5 of FIG. 1.

DESCRIPTION OF PREFERRED EMBODIMENTS

Figure 1:
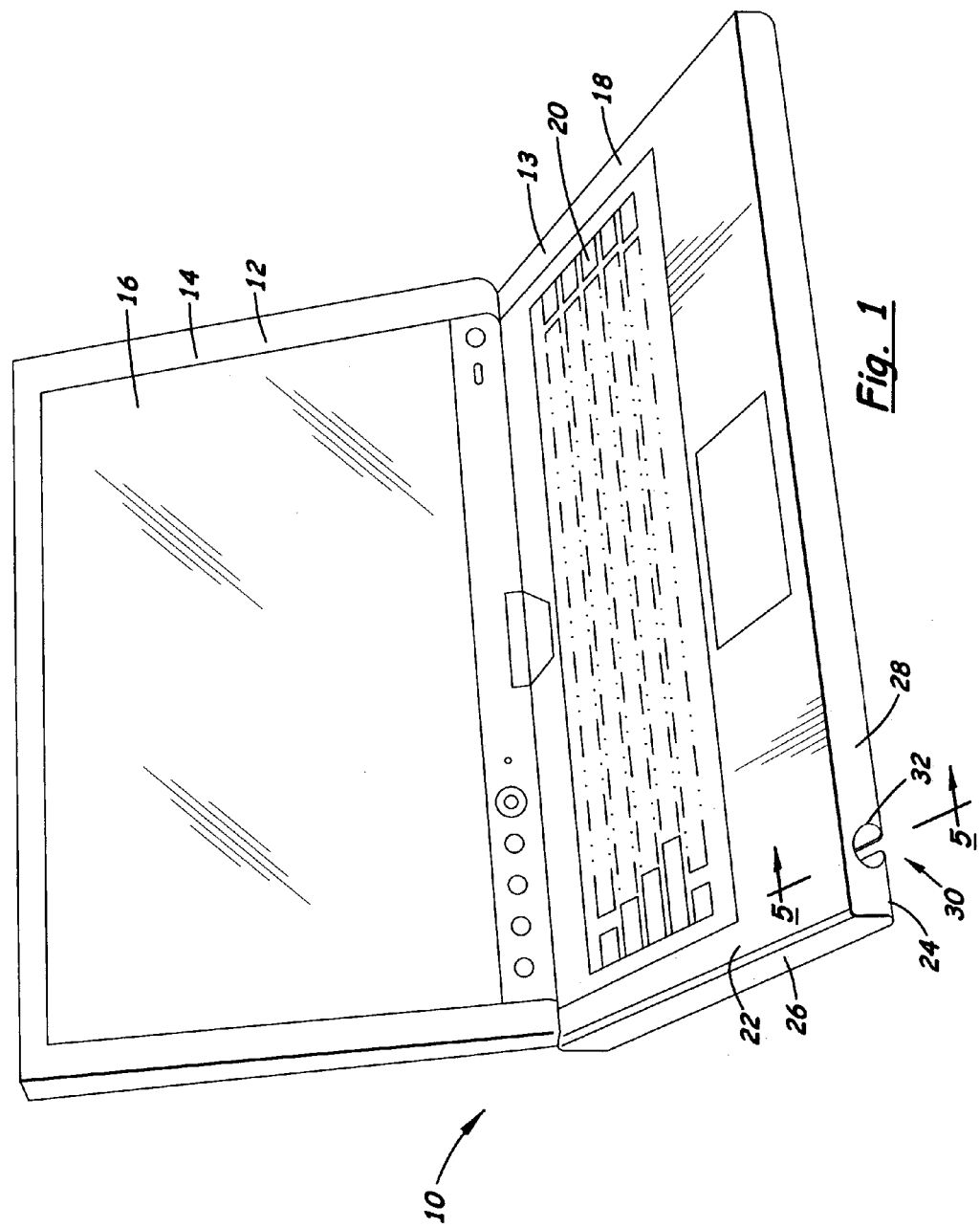
FIG. 1 is a schematic perspective view of a portable computer implementing the system for housing writing instruments of different sizes in a portable computer according to the present invention.

With reference now to the drawings, and in particular to FIGS. 1 through 7 thereof, a new system for housing writing instruments of different sizes in an electronic device embodying the principles and concepts of the present invention and generally designated by the reference numeral 10 will be described.

The present invention is highly suitable for implementation on a portable computer 12, such as a laptop or notebook computer shown in FIG. 1, and while it is believed that the invention finds its greatest advantage on portable computers, it will be evident to those skilled in the art that the invention could also be implemented on relatively less portable computers, such as desktop and tower systems. It will be evident to those skilled in the art that the invention could also be implemented on other electronic devices that use styli and/or touch-sensitive screens, such as cellular phones, personal digital assistants (PDAs), planners and other devices. One typical portable computer configuration has a housing 13 with a clamshell arrangement, with a display portion 14 having a display screen 16, and a keyboard portion 18 that typically has some means of input such as a keyboard 20. The display portion 14 is often pivotally mounted to the display portion, although in some tablet-style portable computers, the display and keyboard portions are also rotationally mounted to each other (see FIG. 1). Optionally, other portable computer configurations may also be suitable for implementation of the invention, including tablet computers with only a single portion or segment, personal digital assistant (PDA) devices, and the like.

In the illustrative portable computer implementation, the keyboard portion 18 may be further characterized by an upper surface 22, and a lower surface 24, and a perimeter surface 26 that extends between the upper and lower surfaces. The keyboard 20 may be located on the upper surface 22 of the keyboard portion. The perimeter surface 26 of the keyboard portion includes a rearward section that is located adjacent to the display portion, and a forward section 28 located opposite of the rearward section on the keyboard portion.

As best shown in FIGS. 2, 4, and 5, a receptacle 30 is located on the housing 13 of the portable computer for removably receiving the writing instrument 40 which is described in greater detail below. The receptacle 30 may be integrated into the housing 13, and may be located on the keyboard portion 18. Preferably, but not critically, the receptacle 30 is located on the perimeter surface 26 of the keyboard portion, and most preferably is located in the forward section 28 of the perimeter surface of the keyboard portion. The receptacle may comprise an opening 32 that is formed in the perimeter surface 26 of the keyboard portion, and a channel 34 that is in communication with the opening 32. The channel 34 extends inwardly with respect to the keyboard portion 18, and may terminate in a blind end 36. The channel 34 has a channel length between the opening 32 and the blind end 36, and also has a channel width. In some embodiments, the channel 34 has a substantially circular cross section and the channel width is thus a diameter. The diameter of the channel 34 may decrease in dimension from the opening 32 to the blind end 36.

The receptacle 30 may also include a slot 38 (see FIG. 4) for receiving a clip 46 of the writing instrument. The slot 38 is in communication with the opening 32 and is also in communication with the channel 34. The slot 38 may extend along only a fractional portion of the length of the channel 34, although the slot could extend along the entirety of the channel.

A suitable writing instrument 40 for use with the invention is elongate and has opposite ends, which include a first end 42 and a second end 44 (see FIG. 3). The first end 42 may include a means for producing or causing of a marking of a surface, such as a somewhat sharpened tip in the case of a stylus, a rolling ball in the case of a pen, or a pencil lead in the case of a pencil, for example. Other writing means may also be employed on the first end 42, including, but not limited to, felt-tipped markers, crayons, and the like. Optionally, the writing instrument may include more than one of the marking means that are selectively extendable from the first end for use.

The second end 44 of the instrument may be contoured in a manner so as to be flush with the perimeter surface 26 of the keyboard portion when the writing instrument is positioned in the receptacle 30. Optionally, the second end 44 of the instrument may include means for grabbing or gripping the end of the instrument, such as rings or tabs that protrude outwardly relative to the perimeter surface. The writing instrument 40 may also include a clip 46 that is mounted on the second end 44 and extends toward the first end 42.

The writing instrument may have a width or diameter that is substantially uniform or that varies along the length of the instrument. For example, a first writing instrument 48 may have a first width, and a second writing instrument 50 may have a second width, with the first width being greater than the second width. Generally, securely holding instruments of different widths in a receptacle without altering the size of the receptacle is problematic, as different housings with different receptacle widths must be employed to achieve a relatively snug and secure holding of the instrument.

A highly significant aspect of the invention is the adapter structure 50 that functions to adapt and adjust the effective width of the receptacle to the width of the writing instrument (see FIGS. 2 and 5). In one embodiment of the invention, the adapter structure 50 comprises a spacer sleeve 52 which is positionable in the channel 34 of the receptacle for being positioned between the channel and the exterior of the writing instrument 40 when the instrument is positioned in the receptacle. The spacer sleeve 52 may be snugly abutted against the channel 34 of the receptacle and also be snugly abutted against the writing instrument 40 when the instrument is positioned in the receptacle.

The spacer sleeve 52 has an exterior surface 54, and has a passage 56 therethrough that is defined by an interior surface 58. The interior surface 58 of the spacer sleeve may have a width that is substantially equal to the second width of the second instrument, so that when an instrument having a width approximately equal to the second width is inserted into the spacer sleeve, it is snugly held in the passage without having to contact the channel of the receptacle. The exterior surface of the spacer sleeve may have a width that is substantially equal to the first width, which is generally the width of the first writing instrument and the width of the interior surface of the channel, so that the spacer sleeve is closely and snugly held in the channel. As a result, the spacer sleeve 52 mimics a writing instrument having the first width while receiving a writing instrument of the second width. The spacer sleeve 52 may be removably received in the channel 34, so that the sleeve may be removed from the channel when relatively wider instruments are being housed in the receptacle, and can be inserted into the channel when relatively narrower instruments are to be housed in the receptacle. The spacer sleeve 52 may have a length that is equal to at least a portion of the channel length, and does not necessarily need to be as long as the channel.

Figure 7:
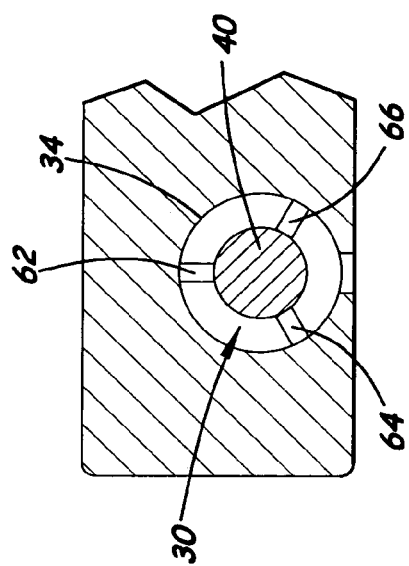
FIG. 7 is a schematic cross sectional view of the housing of the portable computer implementing the variation of FIG. 6 and taken along line 7-7 of FIG. 6.
Figure 6:
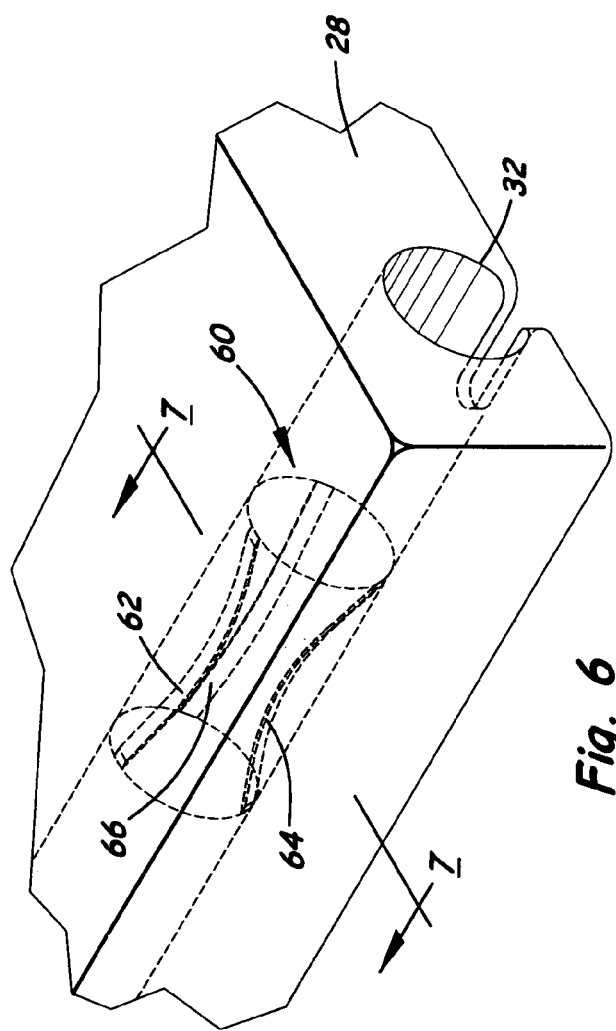
FIG. 6 is a schematic perspective view of a portion of the housing of the portable computer showing a variation of the adapter system of the present invention.

As shown in FIGS. 6 and 7, in another embodiment of the invention the adapter structure may comprise a radial arm spacer 60 with a plurality of spacer arms 62, 64, 66, each of which extending inwardly from a circumference of the channel 34 to engage the exterior surface of the writing instrument when the writing instrument is inserted into the receptacle. The spacer arms 62, 64, 66 may be biased inwardly to adapt to the particular width and contour of the instrument 40 being inserted into the receptacle 30. The arms are preferably formed of a material that exhibits some degree of springy flexible resilience that causes the arms to return to a relatively inward position after the writing instrument is removed from the receptacle.

In an illustrative embodiment of the invention, the first width of the first writing instrument is approximately 12 mm, and the second width of the second writing instrument is approximately 9 mm. In this illustration, the thickness of the wall of the spacer sleeve is approximately 1.5 mm, and the maximum extension of the radial spacer arms when the second instrument is inserted is approximately 1.5 mm. Clearly other sizes may be employed using the principles of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system, comprising:
   a portable computer;
   a writing instrument;
   a receptacle located on the portable computer for removably receiving the writing instrument, the receptacle including an opening on the computer and a channel in communication with the opening and extending inwardly with respect to the computer; and
   adapting means for adapting an effective width of the channel to a width of the writing instrument to thereby hold writing instruments of different widths in the receptacle;
   wherein the adapter means is removably received on the receptacle.

2. The system of claim 1 wherein the adapting means comprises a spacer sleeve positionable between the channel of the receptacle and an exterior of the writing instrument when the instrument is positioned in the receptacle.

3. The system of claim 2 wherein the spacer sleeve has an exterior surface and a passage therethrough defined by an interior surface of the spacer sleeve.

4. The system of claim 3 wherein the writing instrument comprises a first writing instrument, and additionally comprising a second writing instrument, the first writing instrument having a first width, the second writing instrument having a second width, the first width being greater than the second width; and
   wherein a width of the channel is substantially equal to the first width and a width of the passage through the spacer sleeve is substantially equal to the second width.

5. The system of claim 1 wherein the spacer sleeve is snugly abutted against the channel of the receptacle and being snugly abutted against the writing instrument when the instrument is positioned in the receptacle.

6. The system of claim 1 wherein the receptacle is integrated into the portable computer and located on a keyboard portion of the portable computer.

7. The system of claim 1 wherein the channel terminates in a blind end in the portable computer.

8. The system of claim 1 wherein the receptacle additionally includes a slot in communication with the opening and in communication with the channel, the slot extending along a portion of the length of the channel.

9. The system of claim 8 wherein the writing instrument includes a clip, and the slot of the receptacle is configured to receive the clip of the writing instrument.

10. A system, comprising:
    a portable computer;
    a writing instrument;
    a receptacle located on the portable computer for removably receiving the writing instrument, the receptacle including an opening on the computer and a channel in communication with the opening and extending inwardly with respect to the computer; and
    adapting means for adapting an effective width of the channel to a width of the writing instrument to thereby hold writing instruments of different widths in the receptacle;
    wherein the adapting means comprises a plurality of spacer arms extending radially inwardly from a circumference of the channel to engage an exterior of the writing instrument when the writing instrument is inserted into the receptacle.

11. A system, comprising:
    an electronic device;
    a writing instrument;
    a receptacle located on the electronic device for removably receiving the writing instrument, the receptacle including an opening on the electronic device and a channel in communication with the opening and extending inwardly with respect to the electronic device; and
    an adapter structure configured to change an effective width of the channel between at least two widths to thereby hold writing instruments of different widths in the receptacle;
    wherein the adapter structure is removably received on the receptacle.

12. The system of claim 11 wherein the adapter structure comprises a spacer sleeve positionable between the channel of the receptacle and an exterior of the writing instrument when the instrument is positioned in the receptacle.

13. The system of claim 12 wherein the spacer sleeve has an exterior surface and a passage therethrough defined by an interior surface of the spacer sleeve.

14. The system of claim 13 wherein the writing instrument comprises a first writing instrument, and additionally comprising a second writing instrument, the first writing instrument having a first width, the second writing instrument having a second width, the first width being greater than the second width; and
    wherein a width of the channel is substantially equal to the first width and a width of the passage through the spacer sleeve is substantially equal to the second width.

15. The system of claim 12 wherein the spacer sleeve is snugly abutted against the channel of the receptacle and being snugly abutted against the writing instrument when the instrument is positioned in the receptacle.

16. The system of claim 11 wherein the electronic device includes a touch-sensitive screen and the writing instrument comprises a stylus for contacting the screen of the device.

17. The system of claim 11 wherein the channel terminates in a blind end in the electronic device.

18. The system of claim 11 wherein the receptacle additionally includes a slot in communication with the opening and in communication with the channel, the slot extending along a portion of the length of the channel.

19. The system of claim 18 wherein the writing instrument includes a clip, and the slot of the receptacle is configured to receive the clip of the writing instrument.

20. A system comprising:
an electronic device;
a writing instrument;
a receptacle located on the electronic device for removably receiving the writing instrument, the receptacle including an opening on the electronic device and a channel in communication with the opening and extending inwardly with respect to the electronic device; and
an adapter structure configured to change an effective width of the channel between at least two widths to thereby hold writing instruments of different widths in the receptacle;
wherein the adapter structure comprises a plurality of spacer arms extending radially inwardly from a circumference of the channel to engage an exterior of the writing instrument when the writing instrument is inserted into the receptacle.

21. The system of claim 20 wherein the electronic device includes a touch-sensitive screen and the writing instrument comprises a stylus for contacting the screen of the device.

22. The system of claim 20 wherein the channel terminates in a blind end in the electronic device.

23. The system of claim 20 wherein the receptacle additionally includes a slot in communication with the opening and in communication with the channel, the slot extending along a portion of the length of the channel.

24. The system of claim 23 wherein the writing instrument includes a clip, and the slot of the receptacle is configured to receive the clip of the writing instrument.

* * * * *